United States Patent
Giorgio Bort et al.

(10) Patent No.: US 11,035,463 B2
(45) Date of Patent: Jun. 15, 2021

(54) CONTROLLER FOR CONTROLLING A VEHICLE DRIVELINE AND METHOD OF CALIBRATING A VEHICLE DRIVELINE CONTROLLER

(71) Applicant: DANA ITALIA S.R.L., Arco (IT)

(72) Inventors: Carlos Maximiliano Giorgio Bort, Levico Terme (IT); Giulio Ornella, Perrysburg, OH (US)

(73) Assignee: DANA ITALIA S.R.L., Arco (IT)

( * ) Notice: Subject to any disclaimer, the term of this patent is extended or adjusted under 35 U.S.C. 154(b) by 192 days.

(21) Appl. No.: 16/323,002

(22) PCT Filed: Aug. 3, 2017

(86) PCT No.: PCT/EP2017/069603
§ 371 (c)(1),
(2) Date: Feb. 4, 2019

(87) PCT Pub. No.: WO2018/024806
PCT Pub. Date: Feb. 8, 2018

(65) Prior Publication Data
US 2019/0178375 A1 Jun. 13, 2019

(30) Foreign Application Priority Data
Aug. 4, 2016 (EP) .................................... 16425083

(51) Int. Cl.
*F16H 61/468* (2010.01)
*F16H 59/44* (2006.01)
*F16H 61/475* (2010.01)

(52) U.S. Cl.
CPC ........... *F16H 61/468* (2013.01); *F16H 59/44* (2013.01); *F16H 61/475* (2013.01); *B60W 2540/30* (2013.01); *F16H 2059/443* (2013.01)

(58) Field of Classification Search
CPC ..................................................... F16H 61/468
See application file for complete search history.

(56) References Cited

U.S. PATENT DOCUMENTS

| 6,957,138 | B2 | 10/2005 | Kondo et al. | |
| 7,803,086 | B2 * | 9/2010 | Tabata | B60K 6/445 477/3 |

(Continued)

OTHER PUBLICATIONS

European Patent Office, International Search Report with Written Opinion issued in PCT/EP2017/069603, dated Aug. 30, 2017, 10 pages, European Patent Office, Munich, Germany.

(Continued)

*Primary Examiner* — Michael A Berns
(74) *Attorney, Agent, or Firm* — McCoy Russell LLP

(57) ABSTRACT

A controller is configured to output a control command for controlling at least one driveline component according to a control map. The control map may define a dependence of the control command on at least one of: a control position of an input device, and at least one first condition of the driveline. The controller may also be configured to receive at least one input signal, the input signal may have a plurality of signal values recorded at different times. The signal values of the at least one input signal are indicative of at least one of: the control position of the input device, the at least one first condition of the driveline, and at least one second condition of the driveline. The controller may also be configured to derive a feature from the plurality of signal values and adapt the control map based on the derived feature.

15 Claims, 5 Drawing Sheets

(56) References Cited

U.S. PATENT DOCUMENTS

| | | | | |
|---|---|---|---|---|
| 8,280,560 B2* | 10/2012 | Huang | ............... | B60W 40/09 |
| | | | | 701/1 |
| 8,554,428 B2 | 10/2013 | Hubbard et al. | | |
| 8,725,366 B2 | 5/2014 | Hubbard et al. | | |
| 9,199,645 B2* | 12/2015 | Oishi | .................. | B60T 7/042 |
| 10,753,469 B2* | 8/2020 | Witte | ................. | F16H 61/435 |
| 2019/0102840 A1* | 4/2019 | Perl | .................... | B60W 40/09 |
| 2019/0277397 A1* | 9/2019 | Tsuge | .................. | F16H 59/48 |

OTHER PUBLICATIONS

European Patent Office, European Search Report issued in earliest claimed European priority, dated Jan. 19, 2017, 2 pages, European Patent Office, Munich, Germany.

European Patent Office, Extended European Search Report with European search opinion issued in earliest claimed European priority, dated Jan. 19, 2017, 10 pages, European Patent Office, Munich, Germany.

* cited by examiner

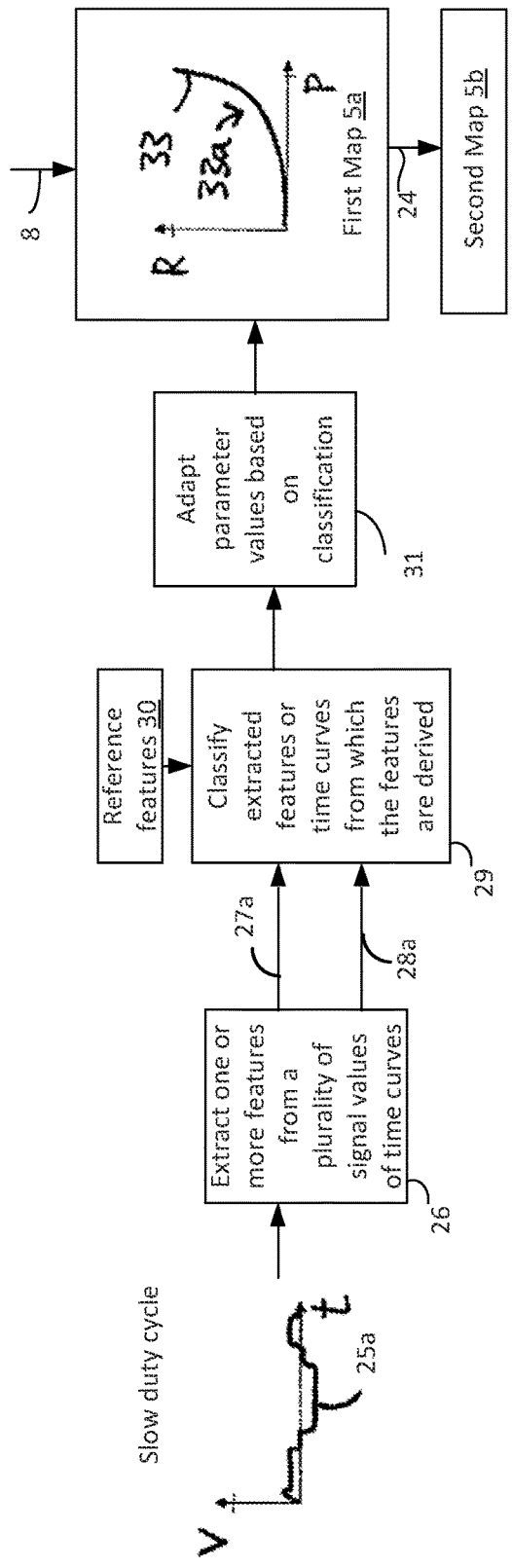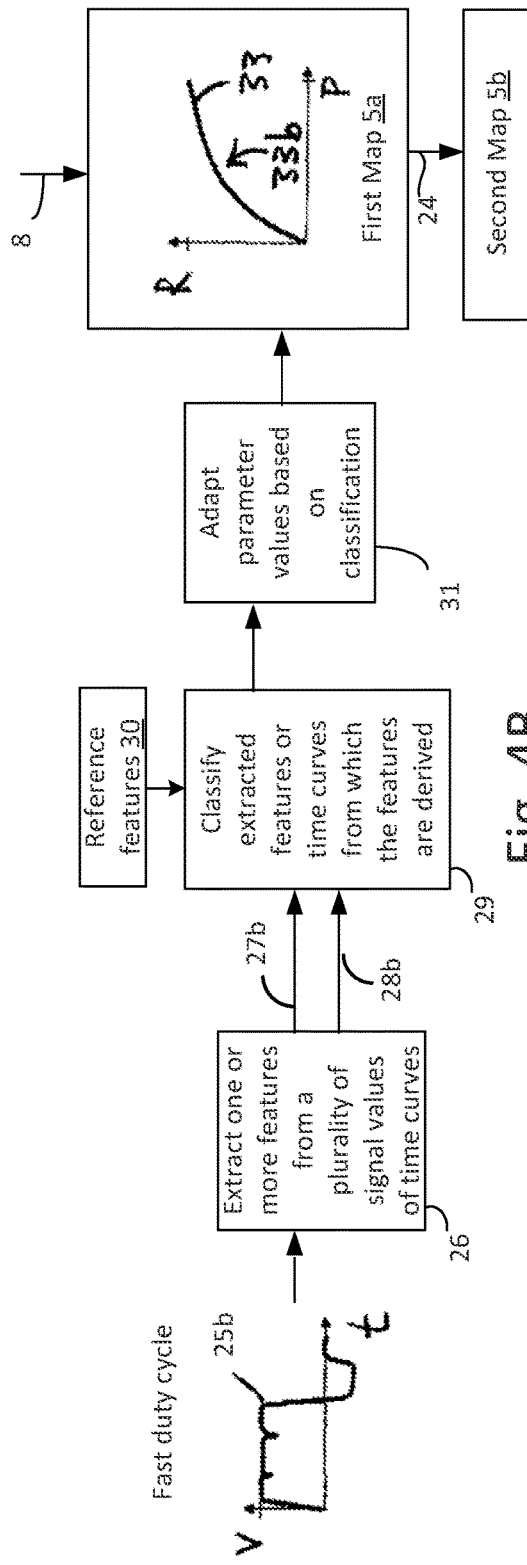
Fig. 4A
Fig. 4B

CONTROLLER FOR CONTROLLING A VEHICLE DRIVELINE AND METHOD OF CALIBRATING A VEHICLE DRIVELINE CONTROLLER

BACKGROUND

The present document primarily relates to a controller for controlling a vehicle driveline, in particular for controlling a vehicle driveline comprising a hydrostatic transmission. Controllers of this sort may find application in off-highway vehicles such as tractors, earth moving vehicles, material handling vehicles, or mining vehicles, for example. The present document further relates to a vehicle driveline including a controller, and to a method of calibrating a vehicle driveline controller.

A vehicle driveline or vehicle powertrain typically comprises means for generating power or torque, typically a power source such as an engine, and for transmitting the generated power or torque to a vehicle output. The vehicle output may include one or more drive axles, one or more wheels and/or one or more working implements such as a boom, a fork, a shovel, or the like. Usually, the driveline comprises at least one of a stepped ratio transmission and a continuously variable transmission so that a drive ratio or speed ratio between the power source and the vehicle output may be discretely or continuously varied according to current operating conditions.

Prominent examples of continuously variable transmissions are hydrostatic transmissions. A hydrostatic transmission usually includes a hydrostatic pump drivingly engaged or selectively drivingly engaged with the power source, and a hydrostatic motor drivingly engaged or selectively drivingly engaged with the vehicle output, wherein the hydrostatic motor is in fluid communication with the hydrostatic pump. In a hydrostatic transmission, power and/or torque may be transferred between the hydrostatic pump and the hydrostatic motor via a hydraulic fluid such as oil. A hydrostatic driveline may furthermore comprise a hydraulic accumulator assembly for storing hydraulic energy and for selectively injecting the stored hydraulic energy into the hydraulic circuit including the hydrostatic pump and the hydrostatic motor.

An operator may control various driveline components using one or more input devices including, for example, at least one of a steering wheel, a joystick, a throttle pedal, one or more levers, and one or more switches. Furthermore, a vehicle driveline usually comprises a driveline controller configured to translate the driver inputs into control commands for controlling one or more driveline components. The driveline controller typically comprises electronic circuitry including, for example, at least one programmable processing unit such as a microcontroller or an FPGA.

Off-highway vehicles in particular may be used for a wide variety of different tasks or duty cycles and under different operating conditions. Among other things, these tasks may include the precise handling of heavy loads at low speed, digging manoeuvres including a frequent change in the direction of travel of the vehicle, or travelling long distances at high speed. Moreover, each driver or operator may have a different style of operating the vehicle.

SUMMARY

Thus, the problem underlying the present invention consists in designing a vehicle driveline controller which is preferably configured such that it guarantees a preferably high degree of manoeuvrability of the driveline for a preferably large number of different duty cycles, and for operators having different driving styles.

This object is solved by a controller for controlling a vehicle driveline and by a method of calibrating a vehicle driveline controller according to the independent claims. Special embodiments are described in the dependent claims.

The presently proposed controller for controlling a vehicle driveline, in particular for controlling a vehicle driveline comprising a hydrostatic transmission, comprises an adaptable control map and is configured to:
output a control command for controlling at least one driveline component according to the control map, the control map defining a dependence of the control command on at least one of:
a control position of an input device, and
at least one first condition of the driveline;
receive at least one input signal, the input signal comprising a plurality of signal values recorded at different times, wherein the signal values of the at least one input signal are indicative of at least one of:
the control position of the input device,
the at least one first condition of the driveline, and
at least one second condition of the driveline;
derive or extract one or more features from the plurality of signal values; and
adapt the control map based on the derived or extracted feature.

For example, the controller may comprise a signal reception unit or signal reception module for receiving the at least one input signal. The controller may comprise an output unit or output module for outputting the control command. The controller may comprise a feature extraction unit or feature extraction module for extracting the one or more features from the plurality of signal values. And/or the controller may comprise a control map adaption unit or control map adaption module for adapting the adaptable control map. The adaptable control map may be in communication with one or more or all of the signal reception unit/module, the output unit/module, the feature extraction unit/module, and the control map adaption unit/module, for example by means of a wired or wireless connection. Each of the adaptable control map, the signal reception unit/module, the output unit/module, the feature extraction unit/module, and the control map adaption unit/module may include electric circuitry and may comprise a processing unit such as a micro processor or an FPGA, for example. It is understood that some or all of the adaptable control map, the signal reception unit/module, the output unit/module, the feature extraction unit/module, and the control map adaption unit/module may be combined in one unit or in one module, or that some or all of these units/modules may be configured as separate units or as separate modules.

The input signal comprising the plurality of signal values recorded at different times includes information that is usually indicative of at least an operator's handling of the input device during a given period of time and/or the condition or change of condition of the driveline during that period. This information may be characteristic of a particular duty cycle and/or of the operator's driving style and may be accessed by deriving or extracting the one or more features from the at least one input signal.

For example, based on the input signal including the time trace of the input signal values a first duty cycle may be distinguished from a different second duty cycle. For instance, the first duty cycle may include the vehicle travelling at a relatively constant speed of at least 40 km/h in the forward direction, and the second duty cycle may include the vehicle loading gravel from a pile onto a truck during repeated Y-cycles. This second duty cycle may include frequent acceleration and deceleration manoeuvres, vehicle speeds of at most 30 km/h, frequent changes between forward and rearward movement of the vehicle, the vehicle coming to intermediate standstills for at least a few seconds each time it unloads the gravel from the bucket onto the truck, frequent lifting and lowering of the bucket, frequent periods of high torque demand from the engine as the vehicle digs into the pile, and frequent changes of the control position of input devices such as a steering wheel, a throttle pedal and a joystick for controlling the working implement.

Furthermore, two different operators may be distinguished based on their individual driving styles even when performing the same task. For example, a first operator may prefer fast and abrupt movements of the vehicle and/or of the working implements, whereas a second operator may prefer slow and smooth movements.

By deriving or extracting the one or more features from the plurality of signal values, the controller is preferably configured or programmed to distinguish different duty cycles and/or different driving styles from one another and to adapt the control map based on the at least one derived or extracted feature or based on the detected duty cycle and/or driving style. For example, as the controller detects a duty cycle which includes frequent fast acceleration and deceleration manoeuvres, the controller may adapt the control map in such a way that a sensitivity of the driveline in the position of the throttle pedal is increased. For example, the controller may adapt the control map such that a given change in the control position of the throttle pedal results in a greater acceleration or deceleration of the vehicle.

Importantly, the controller may be configured to adapt the dependence of the control command on the first driveline condition based on information extracted from a time trace of a different second driveline condition. For example, the first driveline condition may be the vehicle speed and the second driveline condition may be the direction of motion of the vehicle, i. e. forward motion or reverse motion. From a time trace of the direction of motion of the vehicle (the second driveline condition) the controller may then detect that the vehicle is currently used for a task that requires frequent changes in the direction of motion of the vehicle. Based on this finding the controller may modify the control map in such a way that, at a given vehicle speed (the first driveline condition), the engine may accelerate or decelerate faster as the control position of the throttle pedal is altered.

The controller, in particular the output unit or output module of the controller, is typically configured or programmed to transmit the control command as an electromagnetic signal. For example, the control command may include an analog signal and/or a digital signal. The controller, in particular the output unit or output module of the controller, may be configured or programmed to transmit the control command to the driveline component by means of a wired or wireless connection.

The input signal may comprise a digital signal and/or an analog signal. The controller, in particular the signal reception unit or signal reception module of the controller, may be configured or programmed to receive the input signal via a wired or wireless connection. The controller may be configured or programmed to derive the feature not only from the plurality of signal values of the input signal, but additionally from the points in time at which the plurality of signal values are recorded or have been recorded and/or from the duration of the time intervals between the points in time at which the plurality of signal values are recorded or have been recorded. In this way, more information may be derived or extracted from the input signal, for example a time derivative of the signal values.

Preferably, the plurality of signal values from which the controller, in particular the feature extraction unit/module of the controller, derives the feature cover a time span of at least several seconds, of at least several tens of seconds, or of at least several minutes. For example, the plurality of signal values from which the controller derives the feature may cover a time span of at least 5 seconds, of at least 20 seconds, or of at least 60 seconds. Input signals covering a shorter time span may possibly not include enough information to allow a meaningful characterisation of the operator's driving style and/or of the current duty cycle. A sampling rate of the input signal may be at least $1\ \text{s}^{-1}$, at least $10\ \text{s}^{-1}$, or at least $100\ \text{s}^{-1}$.

The driveline component which the controller is configured to control via the control command may comprise at least one of:

an engine, in particular a combustion engine or an electric engine, wherein the control command may be configured to control an engine speed and/or an engine torque;

a hydraulic pump, in particular a hydrostatic pump for a hydrostatic travel circuit and/or a working pump for driving a hydraulic implement, wherein the control command may be configured to control at least one of a hydraulic displacement of the hydraulic pump, a pressure set-point of a hydraulic pressure created by the hydraulic pump, and a flow set-point of a fluid flow created by the hydraulic pump;

a hydraulic motor, in particular a hydrostatic motor for a hydrostatic travel circuit and/or a working motor for driving a hydraulic implement, wherein the control command may be configured to control at least one of a hydraulic displacement of the hydraulic motor, a pressure set-point, and a flow set-point of a flow of fluid through the hydraulic motor;

at least one linear hydraulic actuator, in particular a hydraulic cylinder including a movable piston;

a gear box, wherein the control command may be configured to control a gear selection and/or a gear preselection; and a valve for selectively fluidly connecting a hydraulic accumulator assembly with a hydrostatic travel circuit and/or with a hydraulic implement, wherein the control command may be configured to control a valve state of the valve.

The input device may comprise at least one of:

a pedal, in particular a throttle pedal, a brake pedal, or an inching pedal;

a manual throttle and/or a manual brake;

a lever, in particular a direction lever for controlling a direction of movement of the vehicle;

a steering wheel; and a joystick, in particular a joystick for controlling a working implement.

The at least one first condition and/or the at least one second condition may comprise or may each comprise at least one of:

a vehicle speed or an absolute value of the vehicle speed;

a vehicle acceleration or an absolute value of the vehicle acceleration;

a direction of motion of the vehicle, in particular movement in the forward direction or movement in the reverse direction;

an engine speed;

an engine torque;

a gear selection;

a gear pre-selection, for example the engagement/closing of a clutch or of a set of clutches of a transmission which requires the engagement/closing of at least one additional clutch to select a particular gear;

a hydraulic displacement and/or a speed of a hydraulic pump, in particular of a hydrostatic pump for a hydrostatic travel circuit and/or of a working pump for driving a hydraulic implement;

a hydraulic displacement and/or a speed of a hydraulic motor, in particular of a hydrostatic motor for a hydrostatic travel circuit and/or of a working motor for driving a hydraulic implement;

a hydraulic pressure in at least one of a hydrostatic travel circuit, a hydraulic working assembly, and a hydraulic accumulator assembly selectively fluidly connected with a hydrostatic travel circuit and/or with a hydraulic working assembly;

a position or orientation of a working implement, in particular of a lifting mechanism, a tilting mechanism or a winching mechanism; and a time derivative of a position or of an orientation of a working implement, in particular of a lifting mechanism, a tilting mechanism or a winching mechanism.

The one or more features derived from the plurality of signal values and/or from the points in time at which the plurality of signal values are recorded or have been recorded and/or from the duration of the time intervals between the points in time at which the plurality of signal values are recorded or have been recorded may comprise at least one of:

a maximum value of the plurality of signal values;

a relation between a maximum value of the plurality of signal values and a first threshold value, in particular the maximum value being larger or smaller than the first threshold value;

a minimum value of the plurality of signal values;

a relation between a minimum value of the plurality of signal values and a second threshold value, in particular the minimum value being larger or smaller than the second threshold value;

a mean value of the plurality of signal values;

a relation between a mean value of the plurality of signal values and a third threshold value, in particular the mean value being larger or smaller than the third threshold value;

a number of times the signal value changes sign per unit of time;

a relation between the number of times the signal value changes sign per unit of time and a fourth threshold value, in particular the number of times the signal value changes sign per unit of time being larger or smaller than the fourth threshold value;

a number of times the signal value or an absolute value of the signal value is increased from a value below a fifth threshold value to a value above a sixth threshold value per unit of time, wherein the sixth threshold value is larger than the fifth threshold value;

a time duration during which the signal value is below or above a seventh threshold value, preferably expressed as a percentage of the total time duration covered by the input signal; and a time duration during which the signal value is within a predetermined range of values, preferably expressed as a percentage of the total time duration covered by the input signal.

Preferably, the feature extraction unit/module of the controller is configure to derive the one or more features from the plurality of signal values and/or from the points in time at which the plurality of signal values are recorded or have been recorded and/or from the duration of the time intervals between the points in time at which the plurality of signal values are recorded or have been recorded.

The control map may include at least one control parameter, wherein a value of the control parameter may define the dependence of the control command on at least one of the control position of the input device, and the at least one first condition of the driveline. The controller may be configured or programmed to adapt the control map by adapting at least one value of the at least one control parameter.

The controller may comprise a memory, typically in the form of an electronic and/or magnetic data storage device. The memory may be part of or may be integrated in the feature extraction unit or feature extraction module. The memory may include or may be configured to include or to store a reference data set. The reference data set may comprise a plurality of reference features associated with reference parameter values. For example, each reference feature may be associated with one reference parameter value. The controller may be configured or programmed to classify the feature derived from the plurality of signal values based on the plurality of reference features. The controller may be configured or programmed to assign to the feature derived from the plurality of signal values a subset of the plurality of reference features based on the classification. The controller may be configured or programmed to adapt the value of the control parameter based on the reference parameter values associated with the reference features of the subset.

For example, the controller, in particular the feature extraction unit or feature extraction module of the controller, may be configured or programmed to determine a distance between the feature derived from the plurality of signal values and each of the plurality of reference features. The distance may be a distance in a feature data space the dimension of which depends on the dimension of the particular feature. That is, the physical dimension of the distance is given by the physical dimension of the feature derived from the plurality of signal values and of the reference features. For example, if the feature derived from the plurality of signal values and the reference features have the dimension of velocity, the above-described distance, too, has the dimension of velocity. The controller may then be configured or programmed to assign to the feature derived from the plurality of signal values a nearest reference feature, wherein the nearest reference feature is the reference feature of the plurality of reference features for which this distance takes on the smallest value. And the controller may be configured or programmed to adapt the value of the control parameter by equating the value of the control parameter with the parameter value associated with the nearest reference feature.

The reference data set may comprise data which has been acquired during a training phase. The training phase may include a test operator operating the vehicle during different predefined duty cycles. In particular, the test operator may perform each duty cycle repeatedly, wherein the control map of the controller is changed during each repetition or run of the duty cycle. For example, the control map may be characterized by at least one control parameter value and the control parameter value may be altered for each run of a particular duty cycle. Further, for each run the controller may receive an input signal including a plurality of input signal values recorded at different times. For each duty cycle, the operator may select his preferred run including the at least one preferred control parameter value. The controller may be configured to derive or extract one or more features from the input signal recorded during the preferred run, in particular from the plurality of signal values of the input signal. The controller may then associate the features linked to the preferred run with the at least one control parameter value that defined the control map during the preferred run. The above-defined reference data set may then comprise the reference features and control parameter values associated with the preferred run of each test duty cycle. It is likewise conceivable to construct the reference data set based on a theoretical model of the driveline dynamics or vehicle dynamics. The controller may store this reference data set in its memory.

The control map may comprise a first map, the first map including a mathematical function mapping a position of the input device, and preferably at least one of the first condition and the second condition, on a driveline output request. The driveline output request may include at least one of a torque request, a vehicle speed request, a vehicle acceleration request, and a power request. The controller may be configured or programmed to adapt the control map by adapting the mathematical function of the first map, in particular by adapting the shape of the mathematical function.

The control map may further comprise a second map, the second map mapping the driveline output request, and preferably at least one of the first condition and the second condition, on the control command. The controller may then be configured or programmed to adapt the control map by adapting the second map.

The control map, in particular the second map, may be configured to output the control command for controlling the at least one driveline component according to a control algorithm comprising one or more set points as control variables. The controller may then be configured to adapt the control map, in particular the second map, by adapting a rate of change or a maximum rate of change of at least some of the set points.

The proposed hydrostatic vehicle driveline comprises:
  at least one input device, wherein the input device may include at least one of a pedal, a manual throttle or a manual brake, a lever, a steering wheel, or a joystick, as described above;
  a power source, in particular a combustion engine or an electric engine;
  at least one sensor for measuring an input signal indicative of at least one driveline condition, wherein the at least one sensor may include at least one of a sensor for determining the position of the input device, a sensor for determining a position or orientation of a working implement, a sensor for determining a hydraulic displacement of a hydraulic pump or of a hydraulic motor, a pressure sensor for measuring a hydraulic pressure, a flow sensor for measuring a fluid flow, a vehicle speed sensor, a vehicle acceleration sensor, and a sensor for determining a gear selection;
  a hydrostatic pump drivingly engaged or selectively drivingly engaged with the power source;
  a hydrostatic motor in fluid communication with the hydrostatic pump and drivingly engaged or selectively drivingly engaged with a vehicle output; and
  the previously defined controller configured to receive the input signal from the sensor and to output the control command for controlling at least one of the power source, the hydrostatic pump, and the hydrostatic motor.

The presently proposed method of calibrating a vehicle driveline controller includes at least the following steps:
  receiving at least one input signal, the input signal comprising a plurality of signal values recorded at different times, wherein the signal values of the at least one input signal are indicative of at least one of:
    a control position of an input device,
    at least one first condition of the driveline, and
    at least one second condition of the driveline;
  deriving one or more features from the plurality of signal values; and
  adapting a control map based on the derived feature, wherein the control map defines a dependence of a control command for controlling at least one driveline component on at least one of:
    the control position of the input device, and
    the at least one first condition of the driveline.

The method may further include the step of deriving the one or more features from the points in time at which the plurality of signal values have been recorded and/or from the duration of the time intervals between the points in time at which the plurality of signal values have been recorded.

Adapting the control map may include adapting at least one value of at least one control parameter defining the control map. Additionally or alternatively, adapting the control map may include classifying the one or more features derived from the plurality of signal values based on a plurality of reference features. Adapting the control map may then further include assigning to the one or more features derived from the plurality of signal values a subset of the plurality of reference features based on the classification, and adapting a value of a control parameter defining the control map, wherein the value of the control parameter may be adapted based on reference parameter values associated with the reference features of the subset.

Classifying the one or more features may include determining a distance between the one or more features derived from the plurality of signal values and each of the plurality of reference features, assigning to the feature or to features derived from the plurality of signal values a nearest reference feature for which the distance takes on a minimum value, and adapting the value of the control parameter by equating the value of the control parameter with the parameter value associated with the nearest reference feature.

The control map may include a mathematical function mapping a position of the input device, and preferably at least one of the first condition and the second condition, on a driveline output request, in particular on a torque request, a vehicle speed request, a vehicle acceleration request, or on a power request. Adapting the control map may then include adapting a shape of the mathematical function.

The control map may be configured to output the control command for controlling the at least one driveline component according to a control algorithm comprising one or more set points as control variables. Adapting the control may then include adapting a rate of change or a maximum rate of change of at least some of the set points.

BRIEF DESCRIPTION OF THE DRAWINGS

An exemplary embodiment of the presently proposed controller, driveline and method is described in the following detailed description and depicted in the accompanying drawing in which:

FIG. 4a shows a schematic of an embodiment of a controller architecture according to the present invention, wherein a dependence of a driveline request on a throttle pedal position is adapted based on a first time curve of a vehicle speed;

FIG. 4b shows the controller architecture of FIG. 4a, wherein the dependence of the driveline request on the throttle pedal position is adapted based on a second time curve of a vehicle speed;

DETAILED DESCRIPTION

Figure 1:
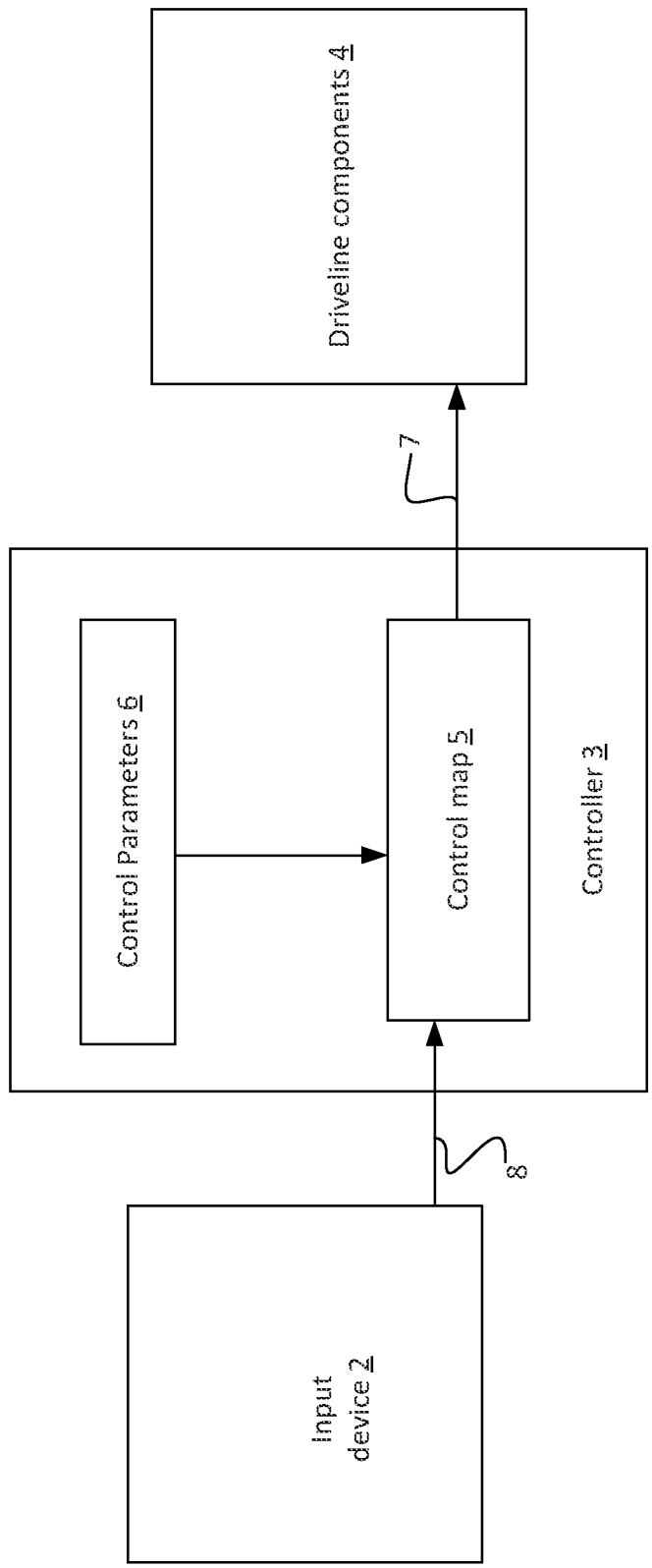
FIG. 1 shows a schematic of a vehicle driveline including a controller for controlling one or more driveline components known from the prior art.

FIG. 1 shows a vehicle driveline 1 known from the prior art. The driveline 1 comprises one or more input devices 2, a driveline controller 3, and one or more driveline components 4. The input devices 2 may include but are not limited to a steering wheel, a throttle pedal and a direction lever, for example. The driveline components 4 may include an engine and a gear box. The controller 3 comprises a control map 5. Further, the controller 3 comprises a set of control parameters 6 having fixed parameter values. The control map 5 defines a relation between one or more output commands 7 for controlling the vehicle components 4 and input signals 8 received from the input devices 2, wherein the relation is determined by the fixed parameter values of the set of control parameters 6. The input signals 8 may be indicative of one or more control positions of the input devices 2. For example, based on the fixed parameter values of the set of control parameters 6 the control map 5 may determine how an engine speed is increased or decreased as an operator of the driveline 1 presses or releases the throttle pedal by a given amount.

Figure 2:
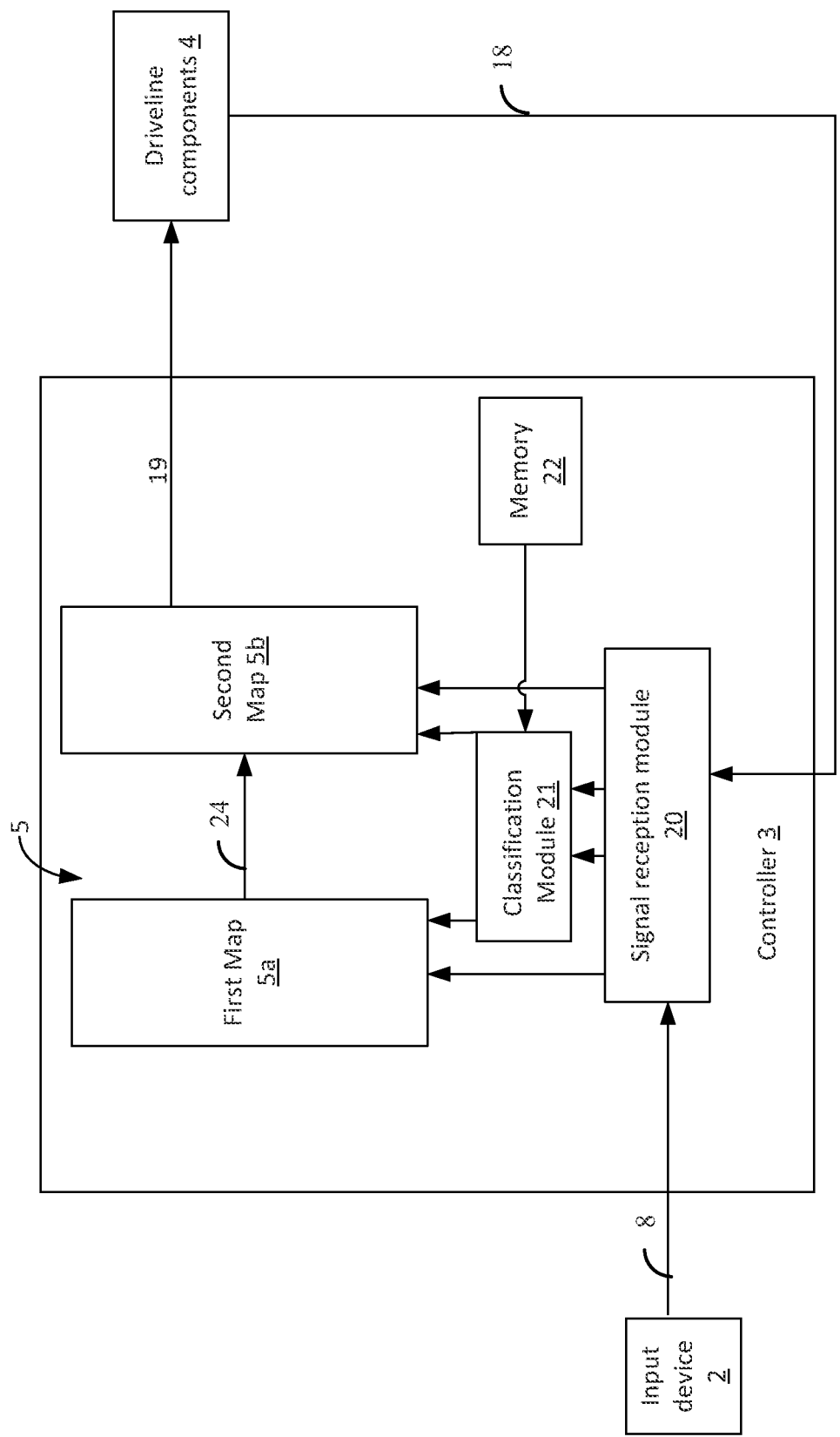
FIG. 2 shows a schematic of an embodiment of a vehicle driveline including an automatically adaptable controller according to the present invention.

By contrast, FIG. 2 shows an embodiment of a driveline 100 according to the present invention. The driveline 100 may be arranged in an off-highway vehicle, for example. Here and in the following recurring features are designated with the same reference signs. The driveline 100 comprises one or more input devices 2, a controller 3 comprising an adaptable control map 5, and driveline components 4. The input devices 2 may include but are not limited to at least one of a throttle pedal, a brake pedal, an inching pedal, a manual throttle, a manual brake, a direction lever for controlling a direction of movement of the vehicle, a steering wheel, and a joystick for controlling the working hydraulics of the driveline 100.

Figure 3:
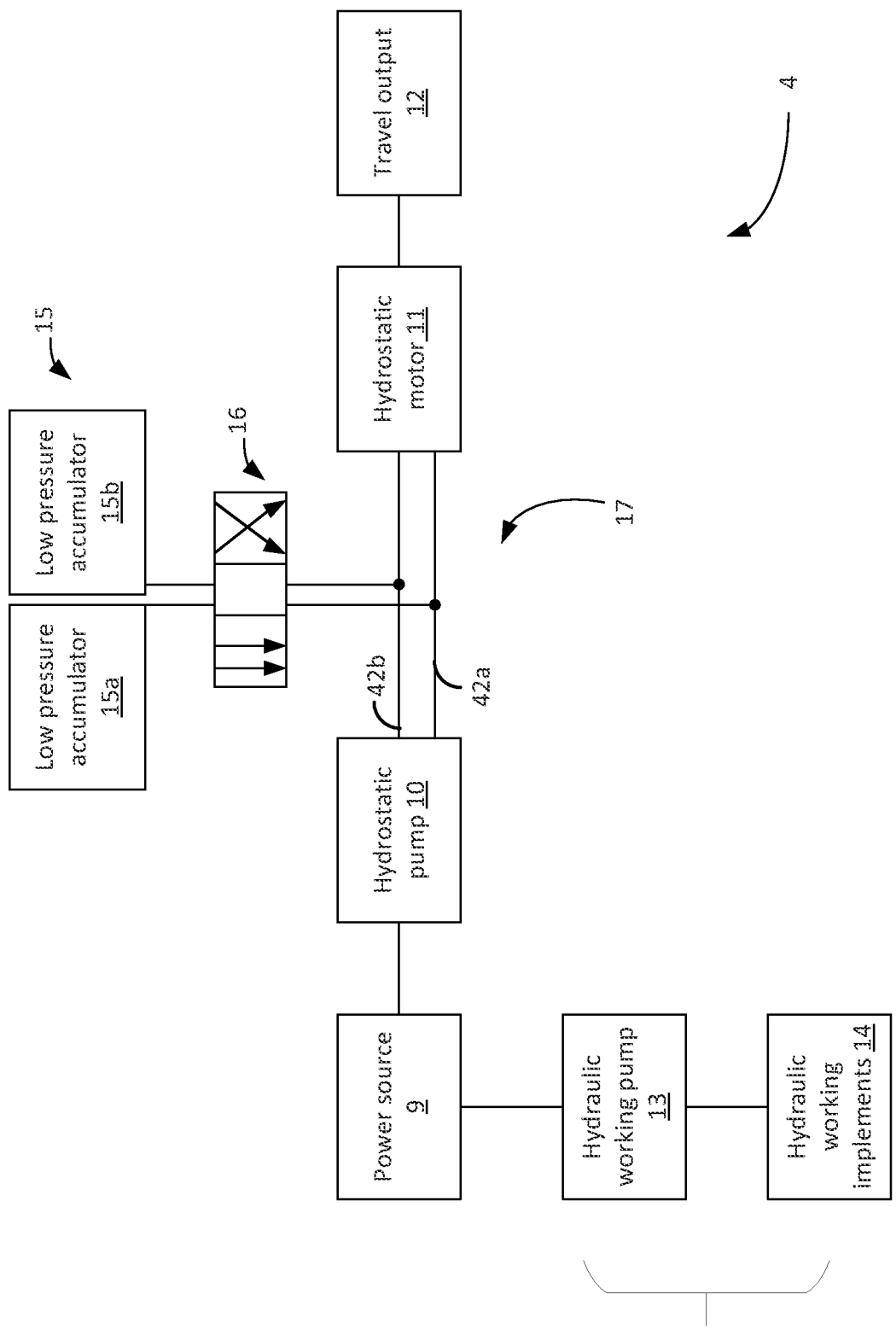
FIG. 3 shows a schematic of the driveline components of FIG. 1.

An embodiment of the driveline components 4 of the driveline 100 of FIG. 2 is depicted in FIG. 3. The driveline components 4 comprise a power source 9, for example an internal combustion engine (ICE) or an electric engine, and a hydrostatic transmission 17 including a hydrostatic pump 10 drivingly engaged or selectively drivingly engaged with the power source 9, and a hydrostatic motor 11 in fluid communication with the hydrostatic pump 10 via fluid lines 12a, 12b. At least one of the hydrostatic pump 10 and the hydrostatic motor 11 may have a variable hydraulic displacement. The driveline components 4 further include a hydraulic accumulator assembly 15 comprising high and low pressure accumulators 15a, 15b which are selectively fluidly connected with the hydrostatic transmission 17 by way of a control valve 16. The accumulators 15a, 15b are configured to absorb hydraulic energy from the hydrostatic transmission 17, for example during regenerative braking, and to store the absorbed hydraulic energy. In order to save fuel or during periods of high torque demand, the hydraulic energy stored in the accumulators 15a, 15b may be injected back into the hydrostatic transmission 17. The hydrostatic motor 11 is drivingly engaged or selectively drivingly engaged with a travel output 12. The travel output 12 may include at least one of a differential, drive axles, reduction drives and one or more wheels, for example.

In addition or as an alternative to the hydrostatic transmission 17 the driveline components 4 may comprise a stepped ratio transmission (not shown). For instance, the stepped ratio transmission may provide selective driving engagement between the power source 9 and the travel output 12 in parallel to the hydrostatic transmission 17 such that the power source 9 may selectively drive the travel output 12 via a hydrostatic drive link or via a direct drive link.

The driveline components 4 further include a hydraulic working assembly 23 comprising a hydraulic working pump 13 drivingly engaged or selectively drivingly engaged with the power source 9, and one or more hydraulic working implements 14 in fluid communication with the hydraulic working pump 13. The working implements 14 may include one or more hydraulic cylinders and/or one or more hydraulic motors. For example, the working implements 14 may be part of a lifting mechanism, a tilting mechanism, or of a winching mechanism. At least one of the working pump 13 and the working implements 14 may have a variable hydraulic displacement.

Back to FIG. 2, the controller 3 is configured to receive one or more input signals 8 from the input devices 2 and one or more input signals 18 from the driveline components 4. For example, at least some or each of the input devices 2 may be equipped with at least one sensor configured to determine the control position of this input device and to transmit a signal which is indicative of the control position of this input device to the controller 3 by way of one of the signals 8. Similarly, at least some or each of the driveline components 4 may be equipped with at least one sensor configured to determine a condition of this driveline component and to transmit a signal which is indicative of the condition of this driveline component to the controller 3 by way of one of the signals 18. As depicted in FIG. 2, the controller 3 may comprise a signal reception unit 20 for receiving the input signals 8, 18.

The condition of the of the power source 9 which may be transmitted to the controller 3 by way of one of the signals 18 may include an engine speed and/or an engine torque. The condition of the hydrostatic transmission 17 which may be transmitted to the controller 3 by way of one of the signals 18 may include at least one of a hydraulic displacement of the pump 10 and/or of the motor 11, a speed of the pump 10 and/or of the motor 11, a fluid flow through the hydrostatic transmission 17, and a hydraulic pressure in at least one of the fluid lines 12a, 12b. The condition of the accumulator assembly 15 which may be transmitted to the controller 3 by way of one of the signals 18 may include at least one of a hydraulic pressure in at least one of the accumulators 15a, 15b and a valve state of the valve 16. The condition of the hydraulic working assembly 23 which may be transmitted to the controller 3 by way of one of the signals 18 may include at least one of a hydraulic displacement of the working pump 13, a hydraulic pressure and/or a fluid flow in the hydraulic working assembly 23, a position or orientation of one or more of the working implements 14, and a time derivative of a position or orientation of one or more of the working implements 14. The condition of the gear box or stepped ratio transmission (not shown in FIG. 3) which may be transmitted to the controller 3 by way of one of the signals 18 may include a gear selection and/or a gear pre-selection. The driveline 100 may further include a vehicle speed sensor. A condition of the driveline 100 which may be transmitted from the vehicle speed sensor to the controller 3 by way of one of the signals 18 may include at least one of a vehicle speed, a vehicle acceleration, and a direction of motion of the vehicle.

The controller 3 is configured to control the driveline components 4 depicted in FIG. 3 by means of one or more control commands 19 which may include digital and/or analog electromagnetic signals, wherein controlling the driveline components 4 may include altering the condition of at least some of the driveline components 4. For example, the controller 3 may be connected to each of the driveline components 4 by means of a wired or wireless connection. The controller 3 is configured to output the control commands 19 for controlling the driveline components 4 according to an adaptable control map 5. The control map 5 defines a dependence of the control commands 19 or of at least some of the control commands 19 on the control position of at least one of the input devices and/or on one or more of the conditions of the driveline 100 or of the driveline components 4. In the embodiment shown in FIG. 2 the control map 5 comprises a first map 5a including a model of the driver, and a second map 5b including a driveline control strategy.

During operation of the driveline 100, the input signals 8 which are indicative of the control position of at least one of the input devices 2 and the input signals 18 which are indicative of one or more conditions of the driveline 100 and/or of the driveline components 4 are continually fed to the 5, in particular to the first map 5a. Based on the inputs from the input devices 2 and from the driveline components 4 the first map 5a outputs a driveline output request 24. The driveline output request 24 may comprise a torque request, a power request, a vehicle speed request, or a vehicle acceleration request. For example, the first map 5a may be configured or programmed to map a position of one or more of the input devices 2 and preferably one or more conditions of the driveline 100 and/or of the driveline components 4 on the driveline output request 24 according to one or more mathematical functions. The form or shape of the mathematical function may be defined by the values of one or more control parameters.

The second map 5b then maps the driveline output request 24 on the one or more control commands 19 for controlling the driveline components 4. The second map 5b, too, may additionally take one or more of the conditions of the driveline 100 and/or of the driveline components 4 as inputs. For example, the map 5, and in particular the second map 5b, may be configured or programmed to output the control commands 19 based on a control algorithm using one or more set points as control variables. The control algorithm may include a closed loop control algorithm or an open loop control algorithm. The functioning of the control algorithm of the map 5, and in particular of the second map 5b, may likewise be defined by the values of one or more control parameters. For instance, the values of these control parameters may define a maximum rate of change at which the set points may be altered.

The controller 3 further comprises a selectively activatable feature detection and classification module 21, and a memory 22 for storing a plurality of reference data sets. It is understood that in FIG. 2 the maps 5a, 5b, the feature detection and classification module 21 and the memory 22 are depicted as separate units merely for illustrative purposes. Typically, they are part of the software architecture of the controller 3 and may or may not be implemented as separate modules. Combined, the feature detection and classification module 21 and the memory 22 may be an embodiment of the above-described feature extraction module and of the above-described control map adaption module. The controller 3 may further comprise an output unit or output module for outputting the output command 19 (not shown). The output unit or output module may be integrated in the control map 5.

By way of the feature detection and classification module 21, the controller 3 is configured or programmed to receive and/or record the input signals 8, 18 over time. The time curves of the input signals 8 comprise the time development of the control positions of the input devices 2, and the time curves of the input signals 18 comprise the time development of the conditions of the driveline 100 and/or of the driveline components 4. Based on the duty cycle of the driveline 100 and/or based on the driving style of the operator of the driveline 100 the time curves of the input signals 8, 18 may exhibit a distinctive shape or pattern. By means of the feature detection and classification module 21 the controller 3 is configured or programmed to derive or extract one or more features from the time curves of the input signals 8, 18.

Based on the reference data sets or based on a theoretical model of the driveline 100 stored in the memory 22, the module 21 of the controller 3 may classify the one or more features derived from the time curves of the input signals 8, 18. According to this classification the controller 3 may adapt the control map 5 in a way that may improve the handling or manoeuvrability of the driveline 100 for the current duty cycle and/or for the current operator. For example, the controller 3 may adapt a value of a control parameter of the control map 5. In particular, the controller 3 may adapt the shape of the mathematical function of the first map 5a, and/or the controller 3 may adapt the control map 5 by adapting a rate of change or a maximum rate of change of a set point of a control algorithm.

An example of a process of adapting the map 5 using the module 21 is depicted in FIGS. 4a and 4b. Specifically, FIG. 4a shows a time curve 25a associated with a slow duty cycle, wherein the time curve 25a represents a vehicle speed v as a function of time t. FIG. 4b shows a time curve 25b associated with a fast duty cycle, wherein the time curve 25b again represents a vehicle speed v as a function of time t. The input signals 18 including the time curves 25a, 25b are received at the signal reception module 20 of the controller 3. The time curves 25a, 25b may be transmitted to the signal reception module 20 from a vehicle speed sensor which may be arranged at the travel output 12 of the driveline 100 (see FIG. 3). The time curves 25a, 25b shown in FIGS. 4a, 4b may each cover a time span of at least 10 seconds, for example.

At 26, the feature detection and classification module 21 extracts one or more features from a plurality of signal values of the time curves 25a, 25b and/or from the points in time associated with the plurality of signal vales. The features which the module 21 extracts from the time curve 25a may include but are not limited to a mean value 27a of the vehicle speed and the number of times 28a the vehicle changes its direction of motion during the time span covered by the time curve 25a. Analogously, the features which the module 21 extracts from the time curve 25b may include but are not limited to a mean value 27b of the vehicle speed and the number of times 28b the vehicle changes its direction of motion during the time span covered by the time curve 25b. As the time curves 25a is associated with a slow duty cycle and the time curve 25b is associated with a fast duty cycle, the features 27a, 28a extracted from the time curve 25a differ from the features 27b, 28b extracted from the time curve 25b associated with a fast duty cycle. For example, the mean speed value 27a calculated from the time curve 25a may be smaller than the mean speed value 27a calculated from the time curve 25b. Also, the number 28a of direction changes per unit of time calculated from the time curve 25a may be larger than the number 28b of direction changes per unit of time calculated from the time curve 25b.

At 29 the module 21 classifies the features 27a, 28a, 27b, 28b or the duty cycles from which the features 27a, 28a, 27b, 28b are derived based on a plurality of reference features 30 stored in the memory 22, or based on a theoretical model of the driveline dynamics which may likewise be stored in the memory 22. Each of the reference features 30 may be associated with one or more control parameter values of the map 5, and in particular of the first map 5a. Alternatively, the reference features 30 may be combined to form sets wherein each set is associated with one or more control parameter values of the map 5, and in particular of the first map 5a. For example, each reference feature set formed from the plurality of reference features 30 may comprise a mean value of the vehicle speed and a number of times the vehicle changes its direction of motion during a predefined time span.

For example, the module 21 may classify the features 27a, 28a extracted from the time curve 25a and the features 27b, 28b extracted from the time curve 25b by comparing them with the plurality of reference features 30 stored in the memory 22. Classifying the features 27a, 28a may include calculating a distance between the features 27a, 28a and each of the plurality of reference features 30, or calculating a distance between the set comprised of the features 27a, 28a and each of the feature sets formed from the plurality of reference features 30, as explained above. Similarly, classifying the features 27b, 28b may include calculating a distance between the features 27b, 28b and each of the plurality of reference features 30, or calculating a distance between the set comprised of the features 27a, 28a and each of the feature sets formed from the plurality of reference features 30, as explained above. In each case the distance may be calculated using a Eucledian metric or another suitable type of metric. After calculating these distance values, the module 21 may determine a nearest reference feature (set) from the plurality of reference features 30, wherein the nearest reference feature (set) is the reference feature (set) for which the calculated distance takes on the smallest value.

At 31 the module 21 may then adapt the parameter values defining the map 5, and in particular the first map 5a based on the previously described classification. For instance, in the embodiment depicted in FIG. 4a the one or more parameter values defining the map 5, and in particular the first map 5a, may be assigned the parameter value or the parameter values associated with the nearest reference feature of the plurality of reference features 30. Analogously, in the embodiment depicted in FIG. 4b the one or more parameter values defining the map 5, and in particular the first map 5a, may be assigned the parameter value or the parameter values associated with the nearest reference feature of the plurality of reference features 30.

It is understood that the above-described classification scheme is merely one of a multitude of classification schemes which the module 21 may apply to classify the features 27a, 28a, 27b, 28b extracted from the time curves 25a, 25b or the duty cycles associated with them. For example, in another embodiment the ranges of possible values of the features 27a, 28a, 27b, 28b may each be divided into a set of predetermined, non-overlapping sub-ranges wherein each sub-range is associated with a different predetermined parameter value or with different sets of predetermined parameter values. Adapting the map 5, and in particular the first map 5a, may then include adapting the parameter values defining the map 5, and in particular the first map 5a, according to the predetermined sub-range or according to the predetermined sub-ranges into which the features 27a, 28a, 27b, 28b extracted from the time curves 25a, 25b fall.

In another embodiment the classification module 21 may be configured to calculate an extrapolation function from the plurality of reference features 30 and from the parameter values associated with the plurality of reference features 30, wherein the extrapolation function maps each set of features extracted from a measured time curve on a set of parameter values defining the map 5, and in particular the first map 5a. The classification module 21 may then further be configured to adapt the one or more parameter values defining the map 5, and in particular the first map 5a, based on the features 27a, 28a extracted from the time curve 25a or based on the features 27b, 28b extracted from the time curve 25b, and based on the extrapolation function.

The map 5, and in particular the first map 5a, may then be adapted based on the features 27a, 28a derived from the time curve 25a, and based on the features 27b, 28b derived from the time curve 25b. Specifically, a mathematical function 33 of the first map 5a mapping a throttle pedal position P on a driveline output request R, in particular on a torque request or on a power request, may be adapted based on the features 27a, 28a, 27b, 28b extracted from the time curves 25a, 25b and based on the plurality of reference features 30 stored in the memory 22. In FIG. 4a the mathematical function 33 of the first map 5a is adapted to exhibit a convex curvature 33a, whereas in FIG. 4b the mathematical function 33 of the function 5a is adapted to exhibit a concave curvature 33b. For example, for the slow duty cycle associated with the time curve 25a in FIG. 4a the manoeuvrability of the driveline 100 may be improved by lowering the sensitivity of the driveline output request R as a function of the throttle pedal position P, as expressed by the convex curvature 33a of the function 33. By contrast, for the fast duty cycle associated with the time curve 25b in FIG. 4b the manoeuvrability of the driveline 100 may be improved by raising the sensitivity of the driveline output request R as a function of the throttle pedal position P, as expressed by the concave curvature 33b of the function 33.

Figure 5A:
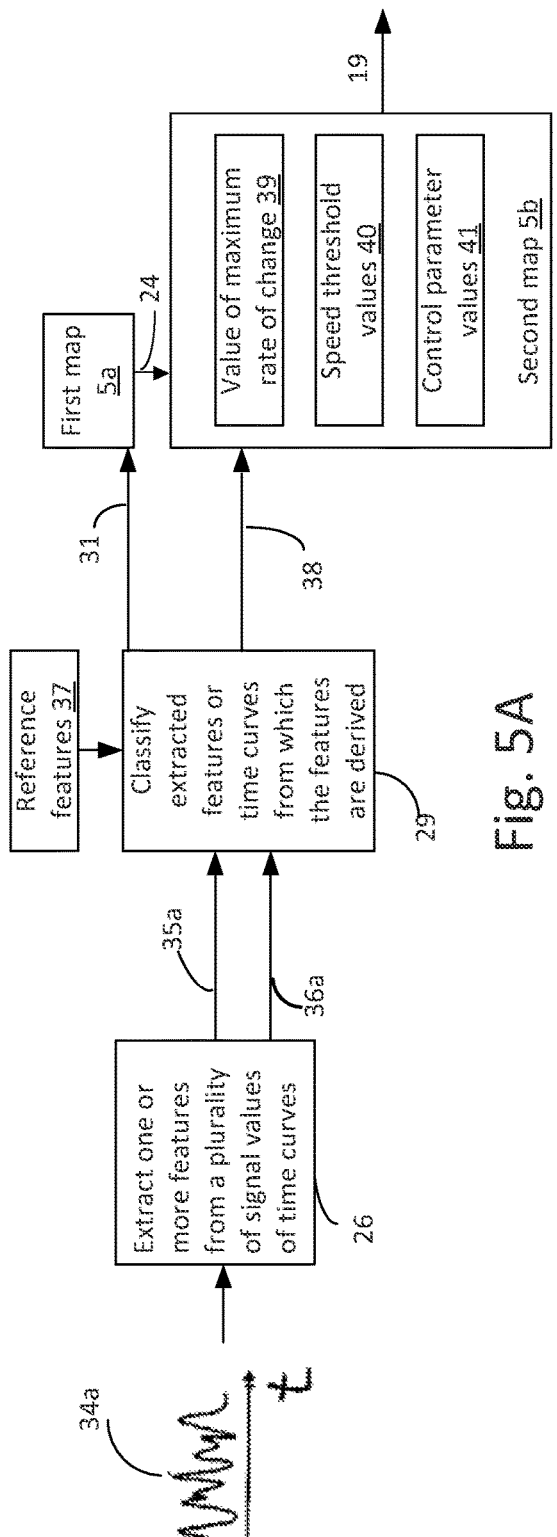
FIG. 5a shows a schematic of an embodiment of a controller architecture according to the present invention, wherein a driveline control strategy is adapted based on a first time curve of a throttle pedal position.
Figure 5B:
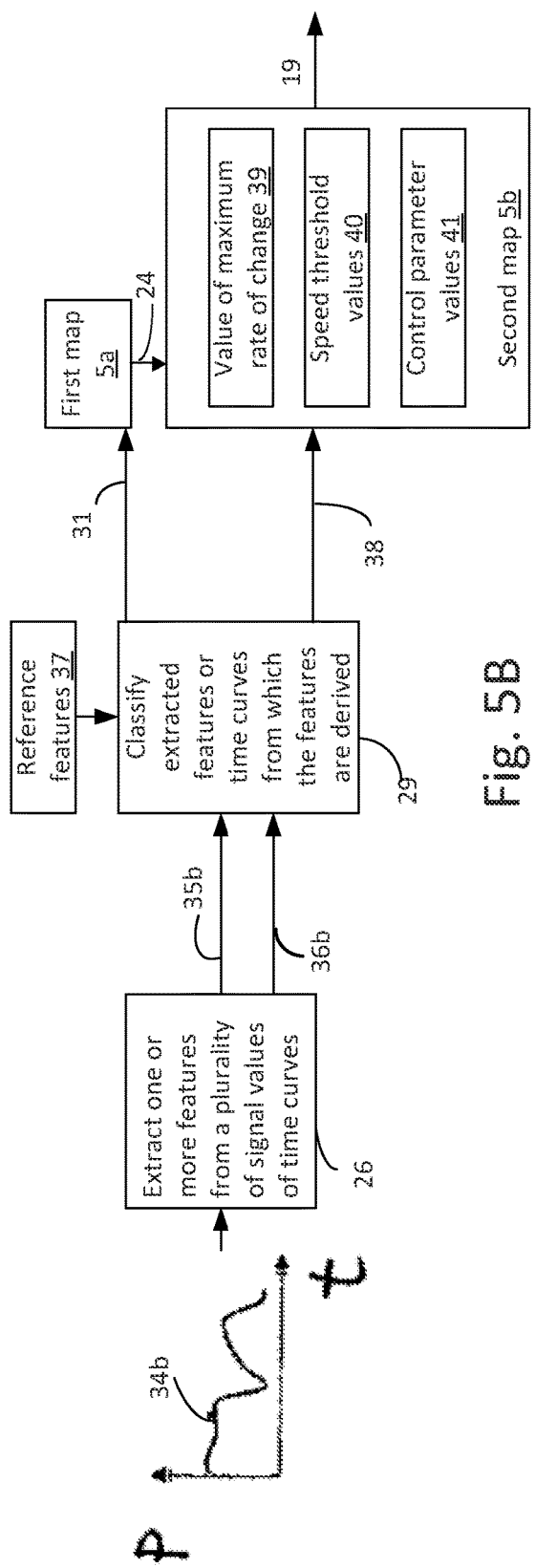
FIG. 5b shows the controller architecture of FIG. 5a, wherein the driveline control strategy is adapted based on a second time curve of a throttle pedal position.

Another example of a process of adapting the map 5 using the module 21 is depicted in FIGS. 5a and 5b. Specifically, FIGS. 5a, 5b show time curves 34a, 34b, wherein the time curves 34a, 34b each represent a throttle pedal position P (measured as a percentage of the fully pressed pedal) as a function of time t. In particular, the time curve 34a shown in FIG. 5a may be associated with an operator having an aggressive driving style, whereas the time curve 34b shown in FIG. 5b may be associated with an operator having a gentle driving style. The input signals 8 including the time curves 34a, 34b are received at the signal reception module 20 of the controller 3. The time curves 34a, 34b may be transmitted to the signal reception module 20 from a throttle position sensor of the driveline 100. The time curves 34a, 34b shown in FIGS. 5a, 5b may each cover a time span of at least 10 seconds, for example.

At 26, the feature detection and classification module 21 extracts one or more features from a plurality of signal values of the time curves 34a, 34b and/or from the points in time associated with the plurality of signal vales. The features which the module 21 extracts from the time curve 34a may include but are not limited to a mean throttle pedal position 35a and a mean rate of change 36a of the throttle pedal position during the time span covered by the time curve 34a. Analogously, the features which the module 21 extracts from the time curve 34b may include but are not limited to a mean throttle pedal position 35b and a mean rate of change 36b of the throttle pedal position during the time span covered by the time curve 34b. As the time curve 34a is associated with an operator having an aggressive driving style and the time curve 34b is associated with an operator having a gentle driving style, the features 35a, 36a extracted from the time curve 34a differ from the features 35b, 36b extracted from the time curve 34b. For example, the mean throttle pedal position 35a calculated from the time curve 34a may have a higher value than the mean throttle pedal position 35b a calculated from the time curve 34b. Also, the mean rate of change 36a of the throttle pedal position calculated from the time curve 34a may be larger than the mean rate of change 36b of the throttle pedal position calculated from the time curve 34b, indicating that on average an operator having an aggressive driving style presses and releases the throttle pedal faster than an operator having a gentle driving style.

At 29 the module 21 classifies the features 35a, 36a, 35b, 36b or the time curves 34a, 34b from which the features 35a, 36a, 35b, 36b are derived based on a plurality of reference features 37 stored in the memory 22. Each of the reference features 37 may be associated with one or more control parameter values of the map 5, and in particular of the second map 5b. Alternatively, the reference features 37 may be combined to form sets wherein each set is associated with one or more control parameter values of the map 5, and in particular of the first map 5a and/or of the second map 5b. For example, each reference feature set formed from the plurality of reference features 37 may comprise a mean throttle pedal position and a mean rate of change of the throttle pedal position during a predefined time span.

For example, the module 21 may classify the features 35a, 36a extracted from the time curve 34a and the features 35b, 36b extracted from the time curve 34b by comparing them with the plurality of reference features 37 stored in the memory 22. Classifying the features 35a, 36a may include calculating a distance between the features 35a, 36a and each of the plurality of reference features 37, or calculating a distance between the set comprised of the features 35a, 36a and each of the feature sets formed from the plurality of reference features 37, as explained above. Similarly, classifying the features 35b, 36b may include calculating a distance between the features 35b, 36b and each of the plurality of reference features 37, or calculating a distance between the set comprised of the features 35a, 36a and each of the feature sets formed from the plurality of reference features 37, as explained above. In each case the distance may be calculated using a Eucledian metric or another suitable type of metric. After calculating these distance values, the module 21 may determine a nearest reference feature (set) from the plurality of reference features 37, wherein the nearest reference feature (set) is the reference feature (set) for which the calculated distance takes on the smallest value.

At 31 the module 21 may then adapt the parameter values defining the map 5, and in particular the first map 5a, based on the previously described classification, for instance according to a scheme similar or equivalent or identical to one of the schemes described above with respect to FIGS. 4a, 4b.

At 38 the module 21 may adapt the parameter values defining the map 5, and in particular the second map 5b, based on the previously described classification. For instance, at 38 the module 21 may adapt parameter values of the second map 5b defining control commands 19 for controlling at least one of the engine 9, the hydrostatic pump 10, the hydrostatic motor 11, a gearbox, and the valve 16 (see FIG. 3) as a function of the driveline output request 24 (see FIG. 2).

For example, at 38 the module 21 may adapt a value of a maximum rate of change 39 of set points used to control at least one of the engine speed, the speed of the hydrostatic pump 10 or the speed of the hydrostatic motor 11. For instance, the module 21 may limit the maximum rate of change 39 of the set points to a first maximum value if, according to the features 35a, 36a extracted from the time curve 34a, the operator has been classified as having an aggressive driving style, and to a second maximum value if, according to the features 35b, 36b extracted from the time curve 34b, the operator has been classified as having a gentle driving style, wherein the first maximum value is higher than the second maximum value.

Furthermore, at 38 the module 21 may adapt a speed threshold value 40 (for example a motor speed threshold value or a vehicle speed threshold value) at which a gear shift is initiated. For example, the module may adapt the speed threshold values 40 in such a way that an upshift is initiated at a first speed if, according to the features 35a, 36a extracted from the time curve 34a, the operator has been classified as having an aggressive driving style, and that an upshift is initiated at a second speed if, according to the features 35b, 36b extracted from the time curve 34b, the operator has been classified as having a gentle driving style, wherein the first speed is higher than the second speed.

Also, at 38 the module 21 may adapt control parameter values 41 determining the connection and disconnection of the hydraulic accumulator assembly 15 to and from the hydrostatic transmission 17. For example, if, according to the features 35a, 36a extracted from the time curve 34a, the operator has been classified as having an aggressive driving style, the module 21 may adapt the control parameter values 41 to allow a fast increase in the torque and/or power available at the driveline output 12 (see FIG. 3). On the other hand, if, according to the features 35b, 36b extracted from the time curve 34b, the operator has been classified as having gentle driving style, the module 21 may adapt the control parameter values 41 of the second map 5b determining the connection and disconnection of the hydraulic accumulator assembly 15 to and from the hydrostatic transmission 17 to maximize fuel efficiency of the driveline 100.

The invention claimed is:
1. A controller for controlling a driveline of a vehicle during operation, wherein the controller is configured to:

output a control command for controlling at least one driveline component according to a control map, the control map defining a dependence of the control command on at least one of:
  a control position of an input device, and
  at least one first condition of the driveline;
receive at least one input signal, the at least one input signal comprising a plurality of signal values recorded at different times, wherein the plurality of signal values of the at least one input signal are indicative of at least one of:
  the control position of the input device,
  the at least one first condition of the driveline, and
  at least one second condition of the driveline;
derive a feature from the plurality of signal values;
adapt the control map based on the derived feature; and
operate the at least one driveline according to the adapted control map.

2. The controller according to claim 1, wherein the controller is configured to derive the feature from the points in time at which the plurality of signal values are recorded and/or from the duration of time intervals between the points in time at which the plurality of signal values are recorded.

3. The controller according to claim 1, wherein the plurality of signal values from which the feature is derived cover a time span of at least 60 seconds, and wherein a sampling rate of the input signal is preferably at least 100 per second.

4. The controller according to claim 1, wherein the driveline component comprises at least one of:
  a power source, including a combustion engine or an electric engine, wherein the control command is configured to control an engine speed or engine torque;
  a hydraulic pump, including a hydrostatic pump for a hydrostatic travel circuit or a working pump for driving a hydraulic implement, wherein the control command is configured to control a hydraulic displacement of the hydraulic pump, or a pressure set-point, or a flow set-point;
  a hydraulic motor, including a hydrostatic motor for a hydrostatic travel circuit or a working motor for driving the hydraulic implement, wherein the control command is configured to control a hydraulic displacement of the hydraulic motor, or a pressure set-point, or a flow set-point;
  at least one linear hydraulic actuator, including a hydraulic cylinder including a movable piston;
  a working implement, including a lifting mechanism, a tilting mechanism or a winching mechanism;
  a gear box, wherein the control command is configured to control a gear selection and/or a gear pre-selection; and
  a valve for selectively fluidly connecting a hydraulic accumulator assembly with a hydrostatic travel circuit or with the hydraulic implement, wherein the control command is configured to control a valve state of the valve.

5. The controller according to claim 1, wherein the input device comprises at least one of:
  a pedal, including a throttle pedal, a brake pedal, or an inching pedal;
  a manual throttle, including a manual brake;
  a lever, including a direction lever for controlling a direction of movement of the vehicle;
  a steering wheel; and
  a joystick, including a joystick for controlling a working implement.

6. The controller according to claim 1, wherein the at least one first condition and/or the at least one second condition comprise or comprises at least one of:
  a vehicle speed or an absolute value of the vehicle speed;
  a vehicle acceleration or an absolute value of the vehicle acceleration;
  a direction of motion of the vehicle;
  an engine speed;
  an engine torque;
  a gear selection;
  a gear pre-selection;
  a hydraulic displacement and/or a speed of a hydraulic pump, including a hydrostatic pump for a hydrostatic travel circuit or of a working pump for driving a hydraulic implement;
  a hydraulic displacement and/or a speed of a hydraulic motor, including a hydrostatic motor for a hydrostatic travel circuit or of a working motor for driving the hydraulic implement;
  a hydraulic pressure in at least one of: a hydrostatic travel circuit, a hydraulic circuit of a hydraulic working assembly, and a hydraulic accumulator assembly selectively fluidly connected to a hydrostatic travel circuit and/or to a hydraulic working assembly;
  a position or orientation of a working implement, including a lifting mechanism, a tilting mechanism or a winching mechanism; and
  a time derivative of a position or of an orientation of the working implement, including the lifting mechanism, the tilting mechanism or the winching mechanism.

7. The controller according to claim 1, wherein the feature derived from the plurality of signal values comprises at least one of:
  a maximum value of each of the plurality of signal values;
  a relation between the maximum value of each of the plurality of signal values and a first threshold value, including the maximum value being larger or smaller than the first threshold value;
  a minimum value of each of the plurality of signal values;
  a relation between the minimum value of each of the plurality of signal values and a second threshold value, including the minimum value being larger or smaller than the second threshold value;
  a mean value of each of the plurality of signal values;
  a relation between the mean value of each of the plurality of signal values and a third threshold value, including the mean value of each of the plurality of signal values being larger or smaller than the third threshold value;
  the number of times each of the signal values of the plurality of signal values changes sign per unit of time;
  a relation between the number of times the signal value changes sign per unit of time and a fourth threshold value, including the number of times the signal value changes sign per unit of time being larger or smaller than the fourth threshold value;
  a number of times the signal value or an absolute value of the signal value is increased from a value below a fifth threshold value to a value above a sixth threshold value per unit of time, wherein the sixth threshold value is larger than the fifth threshold value;
  a time duration during which the signal value is below or above a seventh threshold, expressed as a percentage of the total time duration covered by the input signal; and
  a time duration during which the signal value is within a predetermined range of values, expressed as the percentage of the total time duration covered by the input signal.

8. The controller according to claim 1, wherein the control map includes at least one control parameter, and wherein the controller is configured to adapt the control map by adapting at least one value of the at least one control parameter.

9. The controller according to claim 8, wherein the controller comprises a memory including or configured to include a reference data set, the reference data set comprising a plurality of reference features associated with reference parameter values, wherein the controller is configured to classify the feature derived from the plurality of signal values based on the plurality of reference features, to assign to the feature derived from the plurality of signal values a subset of the plurality of reference features based on the classification, and to adapt the value of a control parameter based on the reference parameter values associated with the reference features of the subset.

10. The controller according to claim 9, wherein the controller is configured to determine a distance between the feature derived from the plurality of signal values and each of the plurality of reference features, to assign to the feature derived from the plurality of signal values a nearest reference feature for which the distance takes on a minimum value, and to adapt the value of the control parameter by equating the value of the control parameter with the parameter value associated with the nearest reference feature.

11. The controller according to claim 1, wherein the control map comprises a first map, the first map including a mathematical function mapping a position of the input device, and at least one of the at least one first condition and the at least one second condition, on a driveline output request, including a torque request, a vehicle speed request, a vehicle acceleration request, or a power request, wherein the controller is configured to adapt the control map by adapting a shape of the mathematical function.

12. The controller according to claim 11, wherein the control map comprises a second map, the second map mapping the driveline output request, and at least one of the at least one first condition and the at least one second condition, on the control command, wherein the controller is configured to adapt the control map by adapting the second map.

13. The controller according to claim 12, wherein the control map, including the second map, is configured to output the control command for controlling the at least one driveline component according to a control algorithm comprising one or more set points as control variables, and wherein the controller is configured to adapt the control map, including the second map, by adapting a rate of change or a maximum rate of change of at least some of the set points.

14. A hydrostatic driveline for a vehicle, comprising:
at least one input device;
a power source, including a combustion engine or an electric engine;
at least one sensor for measuring an input signal;
a hydrostatic pump drivingly engaged or selectively drivingly engaged with the power source;
a hydrostatic motor in fluid communication with the hydrostatic pump and drivingly engaged or selectively drivingly engaged with a vehicle output; and
a controller.

15. A method of calibrating a driveline controller of a vehicle, the method including the steps of:
receiving at least one input signal, the input signal comprising a plurality of signal values recorded at different times, wherein the plurality of signal values of the at least one input signal are indicative of at least one of:
a control position of an input device,
at least one first condition of a driveline, and
at least one second condition of the driveline;
deriving a feature from the plurality of signal values; and
adapting a control map based on the derived feature, wherein the control map defines a dependence of a control command for controlling at least one driveline component on at least one of:
the control position of the input device, and
the at least one first condition of the driveline; and
operating the driveline according to the adapted control map.

* * * * *